(12) United States Patent
Park et al.

(10) Patent No.: US 7,412,602 B2
(45) Date of Patent: Aug. 12, 2008

(54) METHOD AND SYSTEM FOR STORING DOCUMENT IMAGES IN A NETWORK FILE SYSTEM

(75) Inventors: David J. Park, Torrance, CA (US); Vincent Wu, Irvine, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 847 days.

(21) Appl. No.: 10/675,055

(22) Filed: Sep. 30, 2003

(65) Prior Publication Data

US 2005/0071676 A1 Mar. 31, 2005

(51) Int. Cl.
H04L 9/00 (2006.01)

(52) U.S. Cl. .................. 713/182; 713/165; 713/166; 713/193; 709/214; 709/217; 709/223; 709/224; 709/225; 709/216; 709/229; 700/2; 700/5

(58) Field of Classification Search .................. 713/166, 713/182–186, 165–167, 193; 726/2, 26–30; 709/214, 217, 223–225, 216, 229; 700/2, 700/5
See application file for complete search history.

(56) References Cited

U.S. PATENT DOCUMENTS

| | | | |
|---|---|---|---|
| 5,764,866 A | 6/1998 | Maniwa | |
| 6,181,893 B1 | 1/2001 | Collard et al. | |
| 6,248,996 B1 * | 6/2001 | Johnson et al. | 250/234 |
| 6,260,145 B1 * | 7/2001 | Komura et al. | 713/176 |
| 6,289,460 B1 * | 9/2001 | Hajmiragha | 726/28 |
| 6,295,605 B1 * | 9/2001 | Dockter et al. | 713/166 |
| 6,373,507 B1 | 4/2002 | Camara et al. | |
| 6,425,001 B2 | 7/2002 | Lo et al. | |
| 6,426,806 B2 | 7/2002 | Melen | |
| 6,496,849 B1 * | 12/2002 | Hanson et al. | 709/200 |
| 6,546,405 B2 * | 4/2003 | Gupta et al. | 715/512 |
| 6,678,828 B1 * | 1/2004 | Pham et al. | 726/2 |
| 6,715,073 B1 * | 3/2004 | An et al. | 713/156 |
| 2001/0054106 A1 * | 12/2001 | Anderson et al. | 709/227 |
| 2002/0024685 A1 | 2/2002 | Sasaki et al. | |
| 2002/0109870 A1 | 8/2002 | Moore et al. | |
| 2002/0113979 A1 | 8/2002 | Rahgozar et al. | |
| 2002/0191223 A1 | 12/2002 | Ishikawa | |
| 2003/0051208 A1 | 3/2003 | Todaka et al. | |
| 2003/0063326 A1 | 4/2003 | Kiyono et al. | |

OTHER PUBLICATIONS

Avolio, "A Multi-Dimensional Approach to Internet Security" in Putting It Together, Apr./May 1998.*

* cited by examiner

*Primary Examiner*—Kambiz Zand
*Assistant Examiner*—Tongoc Tran
(74) *Attorney, Agent, or Firm*—Tucker Ellis & West LLP

(57) ABSTRACT

The present invention relates to a system and method for saving an image file to a network folder. The present invention enables users to specify access information for an image file, gives users greater flexibility in choosing a network folder as a destination for the image file, and reduces administrative workload in providing user access to the network folder. Generally, the present invention is directed to a system and method for saving an electronic image file to a network folder and comprises an image file to be saved; specifying means for specifying file access information; and associating means for associating the file access information with the image file to be saved, wherein as a result of the associating an access-restricted file is thereby created.

18 Claims, 4 Drawing Sheets

METHOD AND SYSTEM FOR STORING DOCUMENT IMAGES IN A NETWORK FILE SYSTEM

BACKGROUND OF THE INVENTION

The present invention relates to a system and method for saving document images, and more particularly, the present invention relates to a system and method for saving document images to a network folder.

Typically, data transfer networks are provided with one or more document generating devices, such as scanners, copiers, etc., for reading an original document and generating a document image file representative of the document read. These devices are usually available to a multitude of users who create image data and save the image data to a network folder for later use and manipulation. According to a typical system, a privileged user, such as a system administrator, provides user access to the network folder by selecting the appropriate settings in a network administrative setup page, thereby enabling users to save the image data to the network folder. Typically, the administrator must also specify access information for the network folder and communicate the access information to any users who want to save an image file to the network folder. The access information may include usual login information such as, for example, a user name and a password. When the user saves the image file to the network folder, the user will be prompted to input the access information to save the file in the folder. When the user later attempts to retrieve the saved image file, the user will be prompted to again input the access information to retrieve to the image file. Such a conventional system places restraints on both the administrator's workload in having to, inter alia, provide user access, and on users' flexibility in selecting network folders as destinations for the image data.

This type of conventional system is disadvantageous for both administrators and users of the document generating device. The administrator's workload is increased by providing user access and communicating the access information to users. Additionally, relative to the users, because all users must use the same access information, any user with the access information can access an image file saved by any other user. This presents a disadvantage in that one user's image files are accessible by a multitude of other users.

It is desirable to have a system and method for saving document images to a network folder with increased security.

SUMMARY OF THE INVENTION

In accordance with the present invention, there is provided a method and system for saving document images to a network folder.

Additionally, there is a need for a system and method for saving document images to a network folder with increased user flexibility in selecting a network folder. Furthermore, there is a need for a system and method for saving document images to a network folder that reduces administrator workload.

In accordance with one aspect, the present invention provides a system comprising identification means adapted for securing identification information representative of an identity of a user; means adapted for receiving data representative of a user request to open a selected data storage area; security input means adapted for receiving from the user security information associated with a selected data storage operation; allocation means adapted for allocating data storage associated with the selected data storage location; means adapted for storing the identification information and the security information associatively with the selected data storage location; means adapted for receiving document data representative of a document image; means adapted for storing received document data into the selected data storage location; means adapted for receiving information signaling completion of a data storage operation; and means adapted for restricting access to the selected data storage location upon receipt of the information signaling completion of the data storage operation.

In accordance with another aspect, the present invention provides a method for storing document images in a network file system comprising securing identification information representative of an identity of a user; receiving data representative of a user request to open a selected data storage area; receiving from the user security information associated with a selected data storage operation; allocating data storage associated with the selected data storage location; storing the identification information and the security information associatively with the selected data storage location; receiving document data representative of a document image; storing the received document data into the selected data storage location; receiving information signaling completion of a data storage operation; and restricting access to the selected data storage location upon receipt of the information signaling completion of the data storage operation.

These and other aspects, advantages and features of the invention will be understood by one of ordinary skill in the art upon a reading and understanding of the specification.

DETAILED DESCRIPTION OF PREFERRED EMBODIMENTS OF THE PRESENT INVENTION

The present invention is directed to a system and method for saving document images to a network folder. The present invention overcomes the limitations of conventional systems and methods by enabling users to specify access information for document images, by giving users greater flexibility in choosing a network folder as a destination for the document images, and by reducing administrative workload in providing user access.

Figure 1:
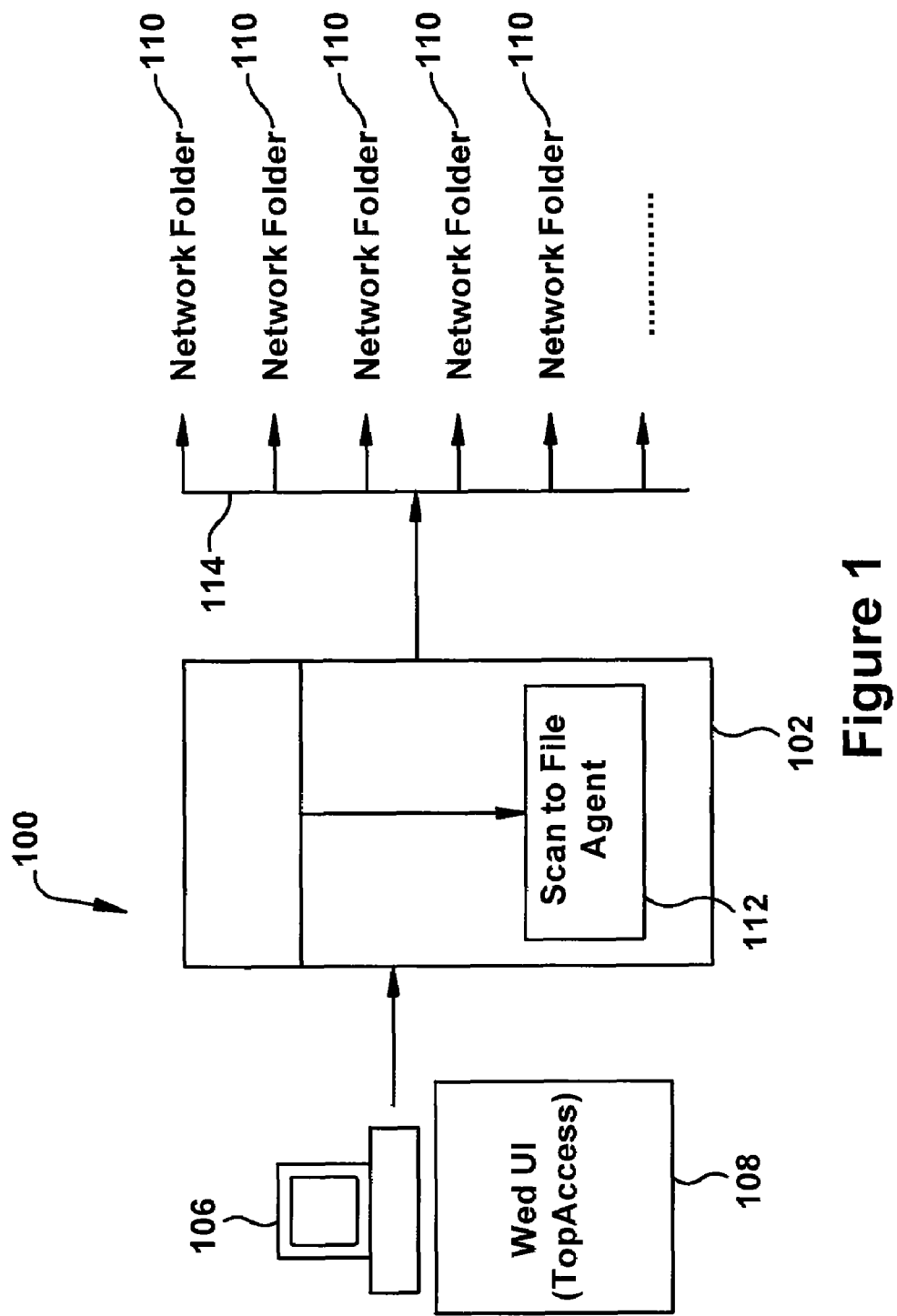
FIG. 1 is a generally block diagram of an example system for implementing the present invention.

With reference to FIG. 1, illustrated is an example system 100 for the present invention. The system 100 includes a data transport network, a document generating device 102, a computer 106, a user interface 108, and a network filer server 114 that comprises at least one network folder 110. The data transport network is illustrative of a LAN or WAN environment, such as a packet-switched TCP/IP-based global communication network. The network is suitably any network and is preferably comprised of physical layers and transport layers, as illustrated by a myriad of conventional data transport mechanisms like Ethernet, Token-Ring™, 802.11(b), or other wire-based or wireless data communication mechanisms as will be apparent to one of ordinary skill in the art. The network may contain any additional elements as known in the art, such as a server computer and may contain more than one of any of the above elements.

The system 100 is provided with the document generating device 102 for optically reading original documents and generating document images representative of the original documents, which document images are capable of being saved and used for or with other applications. The document generating device 102 is suitably any device capable of creating document images, such as, for example, a printer, a facsimile machine, a scanning device, a copier, a multi-function peripheral, etc. The document generating device 102 may be directly connected to the network by any suitable means or may be indirectly connected to the network by being connected to the computer 106 that is, in turn, connected to the network. Additionally, the system 100 is provided with a plurality of document generating devices 102, with one or more of the document generating devices 102 being directly connected to the network and/or one or more of the document generating devices 102 being indirectly connected to the network.

The computer 106, in cooperation with the user interface 108, provides the user with the ability to, inter alia, control the document generating device 102 and to access the network and the network file server 114. The computer 106 may be any suitable device as known in the art for providing a device through which the user can execute the user interface 108 and thereby control the document generating means 102. Additionally, the system 100 may be provided with a plurality of computers 106, such as client computers and server computers. The computer 106 may provide additional functions. For example, the user may use the computer 106 to retrieve the saved document images and manipulate the document images as desired.

Figure 2:
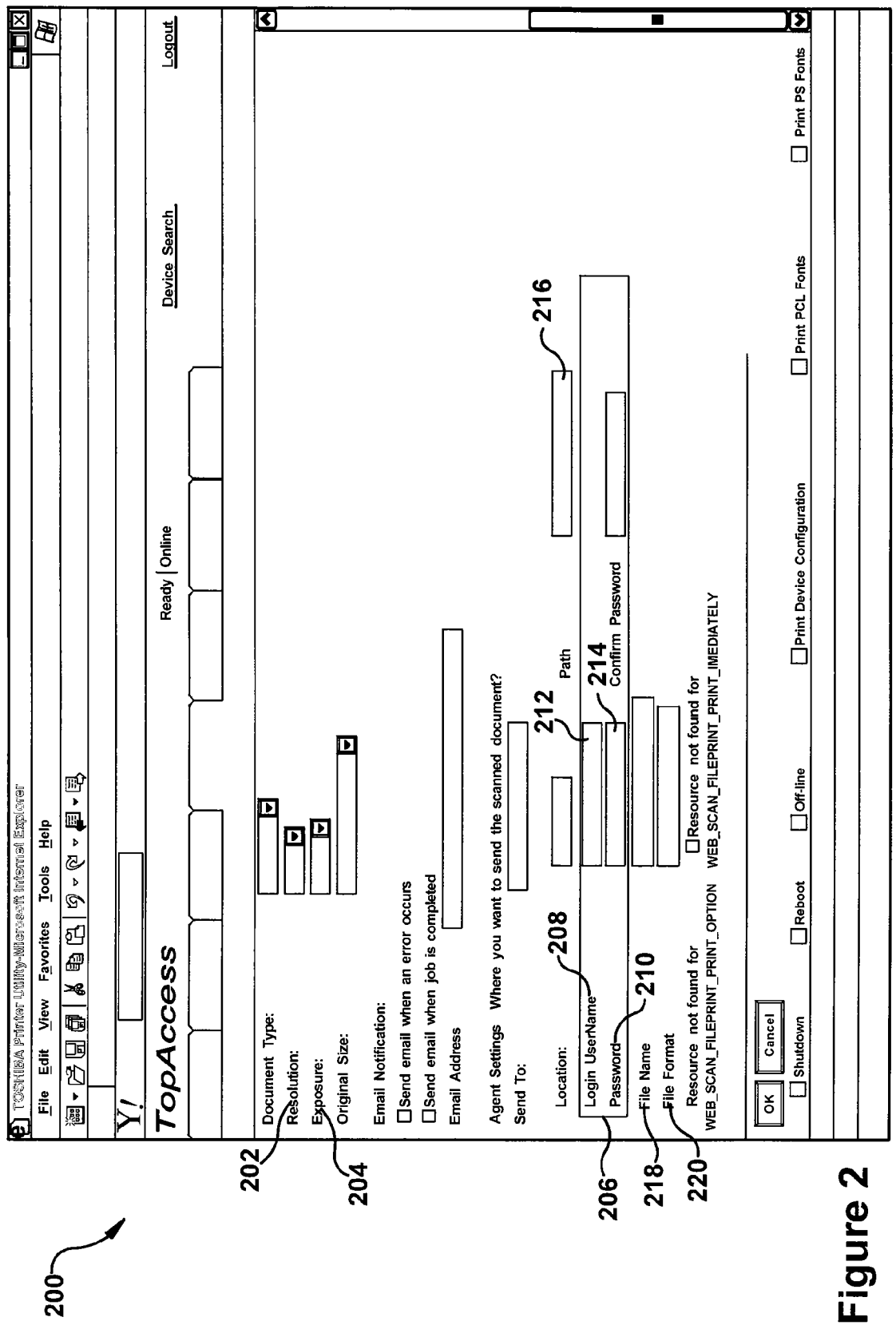
FIG. 2 is an example of a user interface according to an example embodiment of the present invention.

The user interface 108 is executable on the computer 106 in a, for example, browser format, and provides a graphical interface that allows the user to control the document generating means 102 and to direct the saving of the document images to the network file server 114. According to an example embodiment, a Scan to File agent 112 is provided as an operative element of the user interface 108 and provides for the control of the document generating means 102 and for the saving of the document images. Further according to the example embodiment, the user directs the Scan to File agent 112 through the creation of a template. With reference to FIG. 2, shown is an example of a template creation user interface 200 for creating the template. The template creation user interface 200 is a component of the user interface 108 and provides, inter alia, for the user input of directions for the reading by the generating means 102. Such directions include, for example, a resolution setting 202, an exposure setting 204, etc. According to the directions and settings entered, the scan to file agent 112 directs the reading means 102 to read original documents and create the document images.

With further reference to FIG. 2, the template creation user interface 200 is further provided with a specifying means 206 for the user input of file access information. The specifying means 206 enables the user to specify unique file access information, which information will be associated with the document image, as will be more fully discussed below. As the example illustrates in FIG. 2, the specifying means 206 may be provided as one or more text boxes in which the user is able to manually enter, i.e., type, the desired file access information. According to an example, the file access information may comprise password information 210. According to a further example, the file access information may comprise password information 210 and username information 208. Thus, the user may specify the username information 208 in text box 212 and may further specify the password information 210 in text box 214.

The template creation user interface 200 is further provided with or is capable of accessing an associating means for associating the specified file access information with the document images. The associating means may be provided as any device, system or computer-readable code capable of associating the document images with the specified file access information. An access-restricted file is created as a result of associating the file access information with the document image. Various aspects of the access-restricted file will be discussed more fully below.

The template creation user interface 200 is further provided with a selecting means for selecting a network folder 110 to be a destination for saving the access-restricted file, wherein the network folder 110 is selected from among the plurality of network folders 110 available on the network file server 114. An example selecting means is shown in FIG. 2 and generally comprises text boxes and/or menus for selecting the desired network folder 110. For example, the selecting means may include destination parameters, such as a path text box 216, wherein the user may enter a network path corresponding to the desired network folder 110, and a file name text box 218, wherein the user may input a file name to be representative of the access-restricted file. The parameters may additionally contain a file format 220 menu, wherein the user is able to select the file format, e.g., TIFF, to be applied to the access-restricted file.

Another aspect of the present invention relates to increasing user flexibility in selecting a network folder 110 and reducing administrator workload. In order to apply this aspect of the present invention to a conventional system, various changes must be made on an administrative level. Related to the administrative level, the present invention contemplates at least two types of users. The first type is a privileged user, such as an administrator, who has administrative rights and access for administrating the network. The second type of user is a non-privileged user, referred to herein as a user. A user does not have administrative rights and access for administrating the network. According to the present invention, the privileged user will determine a level of access to be granted to the users. According to one embodiment, the privileged user suitable enables the non-privileged user to access the selecting means and select the desired network folder 110 to be used as a destination for the restricted-access file. According to another embodiment, the privileged user suitably specifies a network folder 110 to be used as a destination for all non-privileged users, thereby forcing all non-privileged users to save each non-privileged user's restricted access file in the same network folder 110. Further, the administrator suitable chooses to deny network access to the users.

Figure 3:
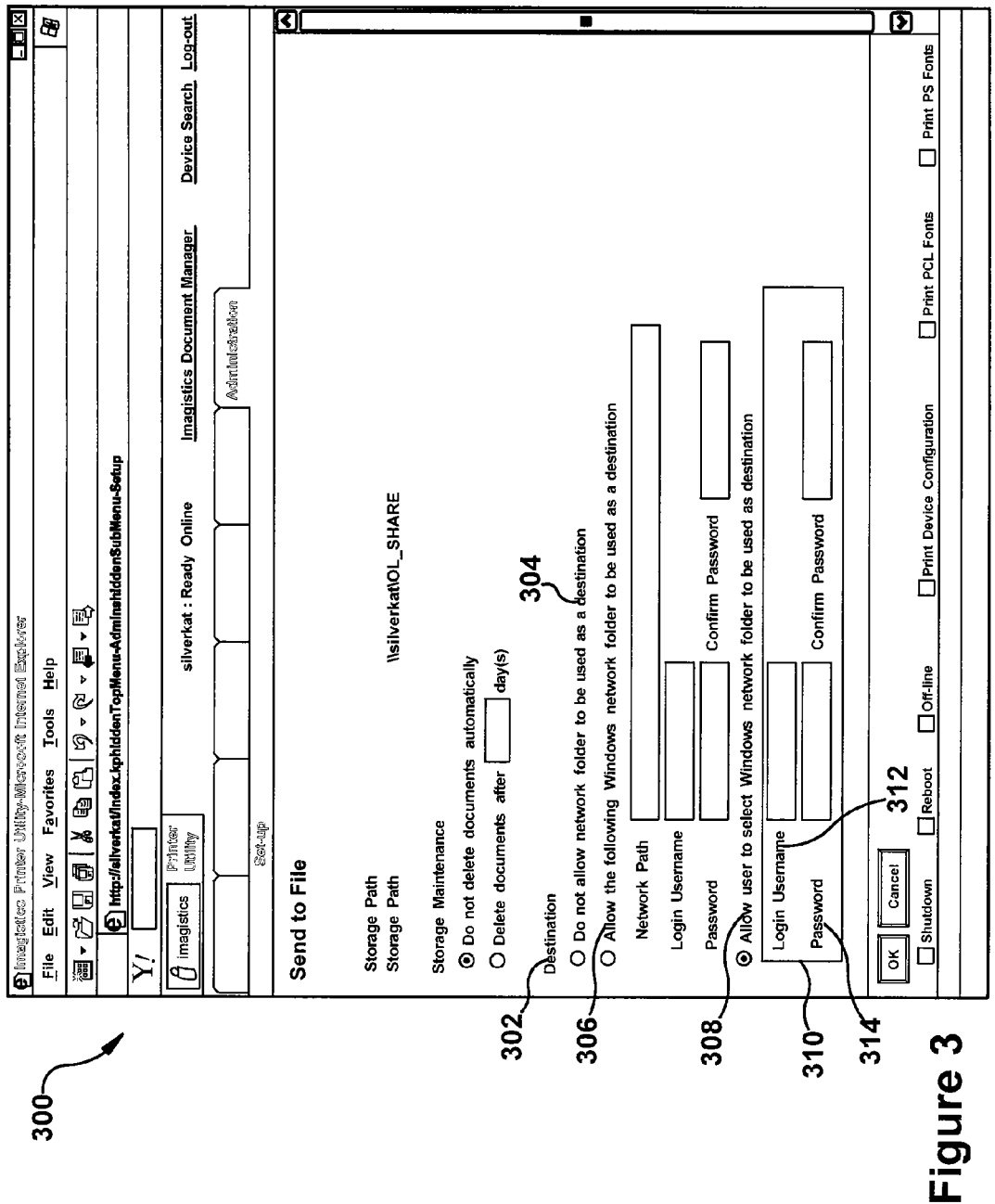
FIG. 3 is an example of an administration setup user interface according to an example embodiment of the present invention.

According to an example embodiment of the present invention, and with reference to FIG. 3, the privileged user controls users' access in an administration setup page 300 for the Scan to File agent 112. According to a conventional system, the Administration Setup Page 300 contains at least three options selectable by the privileged user for controlling user access to the network. The three options are listed under the "Destination" heading 302 and generally include the first option 304 of not allowing a user to select a network folder as a destination, the second option 306 of enabling the privileged user to select one network folder to be used as a destination for all users, and the third option 308 of enabling the privileged user to grant broad access to the users and allow the users to select any network folder as a destination. Further according to the conventional system, if the privileged user selects the third option 308, the privileged user must enter access information 310, such as user name information 312 and password 314 information. Once the privileged user enters this information 310, the privileged user must communicate the information 310 to any user attempting to save a document image to a network folder. When the user attempts to accordingly save the document image, the user will be prompted to enter the information 310 specified by the privileged user so that the non-privileged user can gain access to the network folder.

According to an example embodiment of the present invention, all three options 304, 306, 308 are available to a privileged user. However, in selecting the third option 308, the privilege user will not be required to specify the access information 310. As discussed herein, the user will enter access information as chosen by the user in the Scan to File agent 112.

Returning to FIG. 2, the template creation user interface 200 is further provided with or is capable of accessing a saving means for saving to the selected network folder 110 the access-restricted file. The saving means may be any device, system or computer-readable code capable of effecting the directions specified by the user and of directing the restricted-access file to be saved in the selected network folder 110.

In operation, the system 100 results in the access-restricted file being saved in the network folder 110 selected by the user. The access-restricted file contains the document image representative of the original document read and the file access information specified by the user. When the user attempts to access the saved restricted access file, the user will be prompted to enter the file access information originally specified for the image file by the user. Thus, if the user attempting to access the file is not in possession of the file access information, the user will not be able to access the restricted-access file. Therefore, the system 100 of the present invention advantageously provides a measure for controlling access to image files. Additionally, by allowing a user to choose a network folder and specify a user's own access information, administrator workload is reduced.

Further disclosed according to an example embodiment of the present invention is a method for saving document images to a network folder. The method is implemented in the above-described system 100 and will be understood by one of ordinary skill in the art with reference to the appended claims and the above discussion of the system 100.

Figure 4:
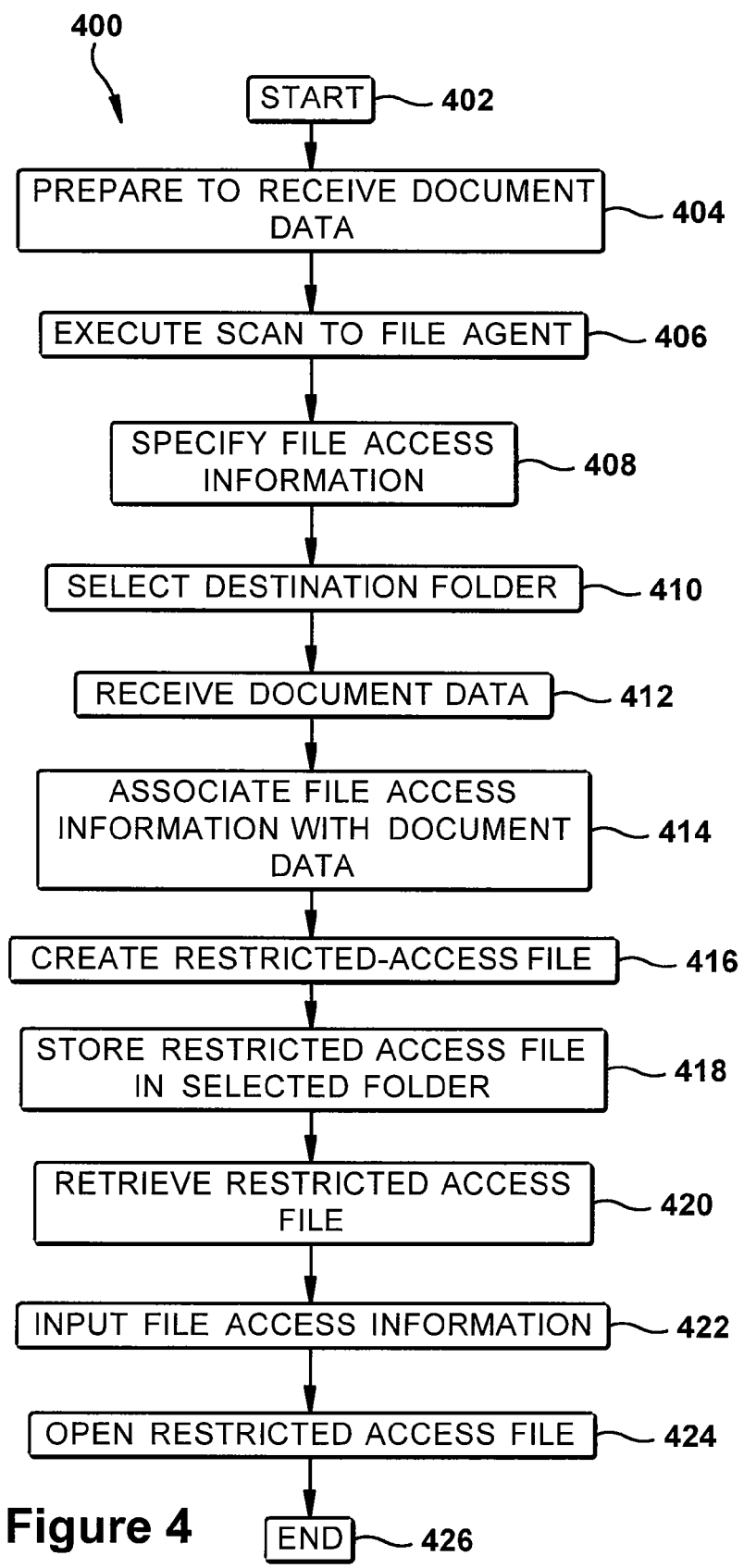
FIG. 4 is a flowchart illustrating an example method according to the present invention.

With reference to FIG. 4, disclosed is a flowchart 400 illustrating an example method according to the present invention. The user begins at step 404 by preparing to receive document data. According to one aspect of the present invention, a scanner is identified for receiving document data. Thus, according to this example, step 404 involves a user placing an original document on a scanner for scanning. At step 406, the user executes the Scan to File Agent, as discussed above. At step 408, the user specifies file access information in the Scan to File Agent, also as discussed above, and at step 410, the user selects a destination folder to be the location for storing the document data. At step 412, after specifying the file access information and selecting the destination folder, the user directs the Scan to File Agent to receive document data by, for example, directing the scanner to scan the original document. At step 414, the file access information is associated with the document data, thereby creating in step 416 a restricted access file. In step 418, the restricted access file is stored in the selected folder. At some point subsequent, the user is able to, in step 420, retrieve the restricted access file for manipulation. When the user attempts to so retrieve, the user will be required, as shown by step 422, to input file access information. The file access information required is the file access information specified by the user for the file in step 408. After the user inputs the proper file access information, the user is able to open the restricted access file in step 424 and manipulate the file as desired.

Although the preferred embodiments have been described in detail, it should be understood that various changes, substitutions and alterations can be made therein without departing from the spirit and scope of the invention as defined by the appended claims. It will be appreciated that various changes in the details, materials and arrangements of components, which have been herein described and illustrated in order to explain the nature of the invention, may be made by those skilled in the art within the principle and scope of the invention as will be expressed in the appended claims.

What is claimed is:

1. A network file system for document images comprising:
identification means adapted for securing identification information representative of an identity of each of a plurality of users via an associated thin client interface;
means adapted for receiving request data from each user, via each associated thin client interface, representative of each user's request to open a selected data storage location;
testing means adapted for testing received identification information from each of the plurality of users to determine approved users privileged to initiate a secure storage operation;
security input means adapted for receiving from each approved user security information associated with a selected data storage operation in accordance with an output of the testing means;
secure user input means adapted for receiving, from each approved user, secure identity information corresponding to identification of a subset of peer users selected by each user for allowing access to selected electronic documents, which subset corresponds to received security information;
allocation means adapted for allocating data storage associated with each selected data storage location, wherein each data storage location is associated with each selecting user;
means adapted for storing the identification information and the security information associatively with each selected data storage location;
notification means adapted for notifying each of selected subset of users corresponding to each data storage location of the user security information and a location of the selected data storage location;
means adapted for receiving document data comprised of a plurality of discrete electronic documents, each electronic document being representative of a document image;
means adapted for storing each received document data into a data storage location corresponding to each user in a subset thereof;
means adapted for receiving information signaling completion of a data storage operation; and
means adapted for restricting access to the selected data storage location upon receipt of the information signaling completion of the data storage operation in accordance with the security information.

2. The network file system of claim 1, further comprising:
login means adapted for receiving from the user a request for access to the data storage location when access has been restricted thereto, the login means including means adapted for acquiring the identification information and the security information;

testing means adapted for testing the identification information and the security information against stored security information; and means adapted for unrestricting the selected data storage in accordance with an output of the testing means.

3. The network file system of claim 2, further comprising:

means adapted for receiving data representative of a user request to open at least one additional data storage location;

wherein the allocation means includes means adapted for allocating data storage associated with the at least one additional data storage area;

wherein the security input means includes means adapted for receiving security information associated with the at least one additional data storage area;

wherein the means adapted for storing the identification information includes means adapted for storing security information associated with the at least one additional data storage area;

wherein the means adapted for storing the identification information and the security information includes means adapted for storing information associated with the at least one additional data storage area associatively with the at least one data storage area;

means adapted for receiving routing data representative as into which data storage area document data is to be routed; and means adapted for routing received document data into a selected data storage location in accordance with the routing data.

4. The network file system of claim 3, wherein each data storage location has unique security information associated therewith.

5. The network file system of claim 3, wherein each data storage location has common security information associated therewith, wherein each of a plurality of data storage locations are accessible by a user during a single session.

6. The network file system of claim 3, wherein the means adapted for receiving document data includes means adapted for receiving document data from at least one of an associated scanner, facsimile, local area network and wide area network.

7. A method for storing document images in a network file system comprising:

securing identification information representative of an identity of each of a plurality of users via an associated thin client interface;

receiving request data from each user, via each associated thin client interface, representative of each user's request to open a selected data storage location;

testing received identification information from each of the plurality of users to determine approved users privileged to initiate a secure storage operation;

receiving, from the each approved users, security information associated with a selected data storage operation in accordance with an output of the testing;

receiving, from each approved user, secure identity information corresponding to identification of a subset of peer users selected by the user for allowing access to selected electronic documents, which subset corresponds to received security information;

allocating data storage associated with each selected data storage location, wherein each data storage location is associated with each selecting user;

storing the identification information and the security information associatively with each selected data storage location;

notifying each of the selected subset of users corresponding to each data storage location of the user security information and a location of the selected data storage location;

receiving document data comprised of a plurality of discrete electronic documents, each electronic document being representative of a document image;

storing each received document data into a data storage location corresponding to each user in a subset thereof;

receiving information signaling completion of a data storage operation; and restricting access to the selected data storage location upon receipt of the information signaling completion of the data storage operation in accordance with the security information.

8. The method of claim 7, further comprising:

receiving from the user a request for access to the data storage location when access has been restricted thereto;

acquiring the identification information and the security information;

testing the identification information and the security information against stored security information; and unrestricting the selected data storage in accordance with an output of the testing.

9. The method of claim 8, further comprising:

receiving data representative of a user request to open at least one additional data storage location;

allocating data storage associated with the at least one additional data storage area;

receiving security information associated with the at least one additional data storage area;

storing security information associated with the at least one additional data storage area;

storing information associated with the at least one additional data storage area associatively with the at least one data storage area;

receiving routing data representative as into which data storage area document data is to be routed; and routing received document data into a selected data storage location in accordance with the routing data.

10. The method of claim 9, wherein each data storage location has unique security information associated therewith.

11. The method of claim 7, wherein each data storage location has common security information associated therewith, wherein each of a plurality of data storage locations are accessible by a user during a single session.

12. The method of claim 7, wherein the received document data is received from at least one of an associated scanner, facsimile, local area network and wide area network.

13. A computer-implemented method for storing document images in a network file system comprising:

securing identification information representative of an identity of each of a plurality of users via an associated thin client interface;

receiving request data from each user, via each associated thin client interface, representative of each user's request to open a selected data storage location;

testing received identification information from each of the plurality of users to determine approved users privileged to initiate a secure storage operation;

receiving, from each approved user, security information associated with a selected data storage operation in accordance with an output of the testing;

receiving, from each approved user, secure identity information corresponding to identification of a subset of peer users selected by the user for allowing access to selected electronic documents, which subset corresponds to received security information;

allocating data storage associated with the selected data storage location, wherein each data storage location is associated with each selecting users;

storing the identification information and the security information associatively with the each selected data storage location;

notifying each of the selected subset of users corresponding to each data storage location of the user security information and a location of the selected data storage location;

receiving document data comprised of a plurality of discrete electronic documents each electronic document being representative of a document image;

storing each received document data into a data storage location corresponding to each user in a subset thereof;

receiving information signaling completion of a data storage operation; and restricting access to the selected data storage location upon receipt of the information signaling completion of the data storage operation in accordance with the security information.

14. The method of claim 13, further comprising:

receiving from the user a request for access to the data storage location when access has been restricted thereto;

acquiring the identification information and the security information;

testing the identification information and the security information against stored security information; and unrestricting the selected data storage in accordance with an output of the testing.

15. The method of claim 14, further comprising:

receiving data representative of a user request to open at least one additional data storage location;

allocating data storage associated with the at least one additional data storage area;

receiving security information associated with the at least one additional data storage area;

storing security information associated with the at least one additional data storage area;

storing information associated with the at least one additional data storage area associatively with the at least one data storage area;

receiving routing data representative as into which data storage area document data is to be routed; and routing received document data into a selected data storage location in accordance with the routing data.

16. The method of claim 15, wherein each data storage location has unique security information associated therewith.

17. The method of claim 15, wherein each data storage location has common security information associated therewith, wherein each of a plurality of data storage locations are accessible by a user during a single session.

18. The method of claim 15, wherein the received document data is received from at least one of an associated scanner, facsimile, local area network and wide area network.

* * * * *